Figure 1:
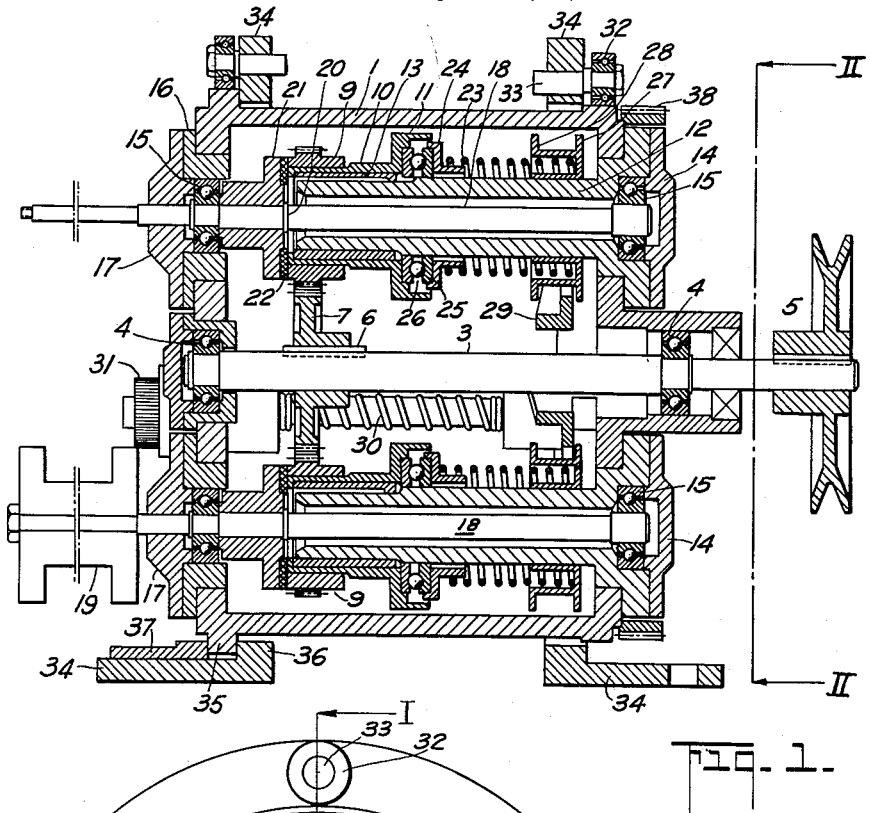

March 24, 1964    H. JAN VAN EIJK    3,126,165

WIRE WINDING DEVICE

Filed April 20, 1961

INVENTOR.
HERMAN JAN VAN EIJK
BY
Frank R. Dufosie
AGENT.

United States Patent Office 3,126,165
Patented Mar. 24, 1964

3,126,165
WIRE WINDING DEVICE
Herman Jan van Eijk, Venlo, Netherlands, assignor to North American Philips Company, Inc., New York, N.Y., a corporation of Delaware
Filed Apr. 20, 1961, Ser. No. 104,361
Claims priority, application Netherlands Jan. 31, 1961
3 Claims. (Cl. 242—80)

A wire winding device is known which is particularly intended for insulated thin copper wire and which is provided with two or more rotating spindles to accommodate reels so that after one reel has been wound a further reel can be wound without the need for stopping and all spindles are accommodated in a common, rotatable housing and are driven in common, while the tensile force to be exerted on the wire to be wound can be adjusted with each individual spindle independently of the other spindles. Such a wire winding device may, for example, be employed in an enamelling system for copper wire and has the advantage that the machine can operate continuously, even when the reel taking up the product of the machine becomes full. In accordance with the invention a wire winding device of the kind set forth is characterized in that on each spindle shaft a gear wheel is arranged so as to be freely rotatable around it. These gear wheels are driven by an intermediate gear or wheels and between each freely rotatable gear wheel and the associated spindle provision is made of an adjustable friction clutch. The invention provides the advantage that the assembly may be of compact construction, while the adjustment of the tensile force of an individual spindle can be carried out accurately without affecting the tensile force of the other spindles.

In one embodiment of the invention each spindle is journalled at one end in a bearing provided in a wall of the housing, whereas the other end of each spindle is journalled in a bearing arranged in a sleeve detachably secured in the opposite wall of the housing. This sleeve is surrounded by a pressure spring, which is loaded on one side by means of an adjustable gland, which engages a ball race of an axial ball bearing at the other side. One ball race of the axial bearing is accommodated in a second sleeve arranged concentrically to and slidably on the first sleeve. A gear wheel is rigidly secured to this second sleeve, one surface of which, together with an associated surface of the gear wheel constituting part of a friction clutch. The other part of the clutch is rigidly secured to the spindle and is enclosed between a shoulder provided on the spindle and one of the surfaces of the bearing provided in the wall of the housing. On the one hand a play-free arrangement (no axial movement) of the spindle shaft, which is important particularly with high speeds of revolution and a small diameter of the wire to be wound, is obtained and on the other hand the friction clutch can be adjusted in a simple and smooth manner.

Figure 2:
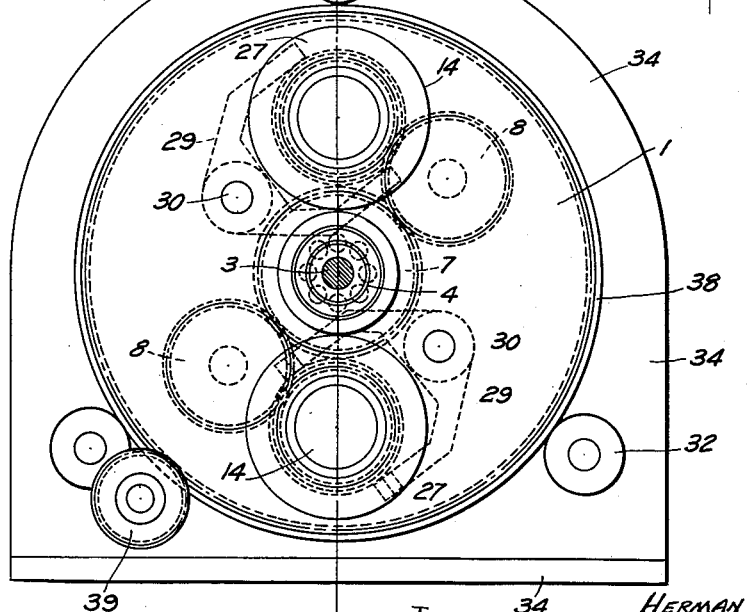

The invention will now be described with reference to a drawing in which
FIG. 1 is a sectional view of a wire winding device taken on the line I—I of FIG. 2, viewed in the direction of the arrows and
FIG. 2 is a sectional view taken on the line II—II of FIG. 1, also viewed in the direction of the arrows.

A housing 1 comprises a driving shaft 3, which is journalled in ball bearings 4—4. On this shaft is arranged a pulley 5. By means of a key 6 a gear wheel 7 is rigidly secured to the shaft. This gear wheel 7 drives intermediate wheels 8 (FIG. 2), which co-operate with gear wheels 9. The gear wheels 9 are rigidly secured to sleeves 10, which are provided at one end with a disc-shaped shoulder 11. The sleeves 10 are adapted to rotate about sleeves 12 and are provided with bearing linings 13. The sleeves 12 are enclosed in the housing 1 by means of lids 14 and have ball bearings 15. The ball bearings 15 at the other end of housing 1 are secured in the housing 1 with the interposition of sleeves 16 by means of lids 17. In the ball bearings 15—15 is rotatably arranged a spindle 18 in concentric spaced relation with sleeve 12 and, on which a reel 19 may be arranged. Between the ball bearings 15—15 and a shoulder 20 on the shaft 18 is secured a cylindrical sleeve 21, which is provided with a felt ring 22. A pressure spring 23 urges a slider 24, slidably arranged on the sleeve 12, against a ball race 25 of an axial pressure ball bearing 26, of which the other ball race is accommodated in the dish-like shoulder 11. Thus, when the spring 23 is depressed, the left hand side of the sleeve 10 and of the gear wheel 9 are urged against the felt ring so that together with the cylindrical sleeve 21 these sides constitute a friction clutch for driving spindle 18. A slider 27, slidable on the sleeve 12, holds the top end of the spring 23. Between two flanges 28 of this slider 27 a U-shaped lever 29 (FIG. 2) can be made operative, which lever can be turned by means of a screw-threaded rod 30 and a knob 31 provided thereon, so that the tension of the spring 23 and the friction of the friction clutch can be adjusted. The housing 1 is capable of rotating between ball bearings 32, which are secured by means of shafts 33 to two supports 34. A cylindrical rim 35 provided on the housing is enclosed between a projecting rim 36 of the supports 34 and an adjustable plate 37, so that the housing 1 cannot be displaced in an axial direction. The housing is furthermore surrounded by a toothed rim 38, with which co-operates a gear wheel 39 (FIG. 2), which can be turned from the outer side, so that the whole housing 1 with the spindles 18 and the reels 19 seated thereon can be turned.

The friction clutch is adjusted during operation by means of the slider 27 so that according as the reel 19 obtains more turns and hence the winding moment would increase and also the tensile force exerted on the wire would increase, a greater slip is involved and the tensile force exerted on the wire remains constant. When the reel is completely filled, the housing 1 is turned through about 180° by means of the gear wheel 39 and the toothed rim 38, without the drive of the pulley 5 being stopped. The reel on the other spindle 18 then comes into contact with the wire to be wound; while the machine continues rotating, this wire is wound a few turns around the new reel by hand and is then broken between the fully wound reel and the empty reel. The full reel can then be removed and a new reel is inserted on the spindle. The removal can be readily carried out since owing to the friction clutch the full reel can be grasped without turning.

The whole winding system is compact and simple; more than two reels may be provided. During the winding process the reel need not be supervised and it is possible to arrange, in known manner, a signalling device indicating the instant when a reel is fully wound, so that the housing can be turned. The wire winding device described above is particularly suitable for use in a wire enamelling system.

What is claimed is:
1. Improved wire winding apparatus comprising:
   a rotatable housing member,
   a plurality of spindles rotatably supported by said member and each adapted to receive a reel means,
   drive shaft means concentric within said member,
   a first sleeve means secured at one end to said member and surrounding a portion of the associated spindle in spaced relation, bearing means at said one end of said sleeve for supporting an associated spindle, another bearing means secured to said housing member for supporting the other end at each said spindle, a driven gear wheel axially and rotatably movable relative to said first sleeve means and operatively associated with said drive shaft means, a second sleeve member secured on said first sleeve at the other end thereof for supporting said driven gear wheel, clutch means operatively connecting the spindle and said driven gear wheel, and means for varying the friction forces of said clutch means.

2. Improved wire winding apparatus comprising:
a rotatable housing member,
a plurality of spindles rotatably supported within said member and each adapted to receive a reel means located without said member,
a drive shaft means concentric within said member,
each said spindle having a first sleeve means detachably secured to an end wall of said member and concentrically surrounding a portion of each said spindle within said member in spaced relation,
bearing means within each said first sleeve means at said end wall for supporting one end of an associated spindle,
complementary bearing means in a remote wall of said member for supporting the other end of said spindles,
a slidable sleeve member freely supported on said first sleeve member adjacent the other end thereof,
a driven gear wheel rigidly secured on said slidable sleeve member and operatively associated with said drive shaft means,
a clutch member secured on each said spindle adjacent each said driven gear wheel,
friction means intermediate said clutch member and said driven gear wheel whereby said spindle is rotatably driven,
resilient means operatively associated with said slidable sleeve means to urge said driven gear wheel and said clutch member into engagement,
and manually operable means for varying the force of said engagement.

3. Improved wire winding apparatus comprising:
a rotatable housing member,
a plurality of spindles rotatably supported within said member and each adapted to receive a reel means located without said member,
a drive shaft means concentric within said member,
each said spindle having a first sleeve means having one end detachably secured to an end wall of said member and concentrically surrounding a portion of each said spindle in spaced relation,
bearing means within each said sleeve at said end wall for supporting the associated spindle,
complementary bearing means in a remote wall of said member supporting the other end of each said spindle,
a bearing member mounted on said first sleeve means at the other end thereof,
an axially movable and rotatable sleeve member having a disc-shaped shoulder and operatively associated with said bearing member,
a driven gear wheel rigidly secured on said slidable sleeve member and operatively associated with said drive shaft means,
a second sleeve member secured on each said spindle and having shoulder means adjacent each said driven gear wheel,
friction means intermediate said second sleeve and said slidable and rotatable sleeve member and associated driven gear wheel whereby said spindle is rotatably driven,
a slider slidably mounted on said first sleeve means remote from said second sleeve means,
a spring concentrically surrounding said first sleeve means intermediate said slider and said axially movable and rotatable sleeve member,
axial roller bearing means intermediate said disc-shaped shoulder and said spring,
a second slider slidably mounted on said first sleeve member and intermediate said axial roller bearing means and the adjacent end of said spring,
and manually operated U shaped lever means operatively associated with said first named slider for compressing said spring to vary the force acting on said friction means.

References Cited in the file of this patent
UNITED STATES PATENTS

| | | |
|---|---|---|
| 638,012 | Hazard | Nov. 28, 1899 |
| 1,637,700 | Lee et al. | Aug. 2, 1927 |
| 2,378,024 | MacChesney | June 12, 1945 |
| 2,653,773 | Davis | Sept. 29, 1953 |
| 2,779,545 | Hauck et al. | Jan. 29, 1957 |
| 2,786,638 | Fullerton | Mar. 26, 1957 |